(12) United States Patent
Chen et al.

(10) Patent No.: US 12,015,200 B2
(45) Date of Patent: Jun. 18, 2024

(54) INTERFACE STRUCTURES FOR WIRELESS COMMUNICATION DEVICES

(71) Applicant: Apple Inc., Cupertino, CA (US)

(72) Inventors: Yue Chen, San Jose, CA (US); Andrew A. Efanov, Sunnyvale, CA (US); Avee Arvind, Mill Valley, CA (US); Larbi Azzoug, San Jose, CA (US); Thuy Nguyen, San Jose, CA (US); William J. Noellert, Austin, TX (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 17/468,525

(22) Filed: Sep. 7, 2021

(65) Prior Publication Data

US 2023/0072031 A1    Mar. 9, 2023

(51) Int. Cl.
*H04B 5/70*    (2024.01)
*H01Q 1/27*    (2006.01)
*H01Q 1/42*    (2006.01)
*H01Q 9/04*    (2006.01)

(52) U.S. Cl.
CPC ............. *H01Q 1/421* (2013.01); *H01Q 1/273* (2013.01); *H01Q 1/422* (2013.01); *H01Q 9/0407* (2013.01); *H04B 5/70* (2024.01)

(58) Field of Classification Search
CPC ........... H01Q 1/40; H01Q 1/405; H01Q 1/42; H01Q 1/421; H01Q 4/422; H01Q 1/427; H01Q 1/2258; H01Q 1/2266; H01Q 1/2283; H01Q 1/24; H01Q 1/241; H01Q 1/242; H01Q 1/243; H01Q 1/273; H01Q 9/0407; H01Q 9/0442; H01Q 15/02; H01Q 15/08; H01Q 15/14; H01Q 19/06; H01Q 19/062; H01Q 19/09; H04B 5/0025; H04B 5/0031
See application file for complete search history.

(56) References Cited

U.S. PATENT DOCUMENTS

| | | |
|---|---|---|
| 10,547,339 B2 | 1/2020 | Shiu et al. |
| 10,742,250 B1 | 8/2020 | Hiemstra et al. |
| 11,050,463 B2 | 6/2021 | Hiemstra et al. |
| 2017/0222301 A1* | 8/2017 | Shiu ............. H01Q 1/2291 |
| 2018/0309188 A1* | 10/2018 | Jeon ............. H04B 5/0025 |
| 2019/0097301 A1 | 3/2019 | Wu et al. |
| 2019/0165473 A1* | 5/2019 | Yun ............. H01Q 21/062 |

* cited by examiner

*Primary Examiner* — Robert Karacsony
(74) *Attorney, Agent, or Firm* — Treyz Law Group, P.C.; Tianyi He

(57) ABSTRACT

A wireless communication system may include an electronic device having an antenna element. The antenna element may convey radio-frequency signals greater than 10 GHz across a dielectric housing wall. A dielectric matching structure may be interposed between the antenna element and the dielectric housing wall. The wireless communication system may include external equipment having an antenna element communicatively coupled to the electronic device antenna element to convey firmware testing, debugging, restore, and/or other data via a near-field wireless communication link. The external equipment may be configured to receive the electronic device at an opening. A dielectric matching structure may be provided at the external equipment between the dielectric housing wall and the external equipment antenna element. The interior surface of the dielectric housing wall may have planar, convex, or concave portions.

17 Claims, 13 Drawing Sheets

INTERFACE STRUCTURES FOR WIRELESS COMMUNICATION DEVICES

BACKGROUND

This relates generally to electronic devices, including electronic devices with wireless circuitry.

Electronic devices are sometimes provided with wired connectors that enable wired connections to external equipment. Among other issues, some wired connector structures can be bulky and take up excess space within the electronic devices. It can be desirable to provide wireless circuitry in place of wired connectors.

To satisfy consumer demand for small form factor electronic devices, manufacturers are continually striving to implement wireless circuitry using compact structures. Because antennas in the wireless circuitry have the potential to interfere with each other and with other components in a wireless communication device, care must be taken when incorporating antennas into an electronic device to ensure that the wireless circuitry is able to exhibit satisfactory performance. It can be desirable to provide improved wireless circuitry for electronic devices.

SUMMARY

An electronic device may include a housing and wireless circuitry mounted within the housing. The wireless circuitry may include an antenna element that is configured to convey radio-frequency signals through a housing wall in the housing at one or more frequencies greater than 10 GHz such as at a frequency band including 60 GHz, at other centimeter and millimeter wave frequency bands, at terahertz wave frequency bands, etc. The housing wall may be formed from one or more dielectric materials with relatively high dielectric constants such as dielectric constants greater than 5, greater than 7, greater than 10, greater than 20, etc. In these illustrative configurations, it may be challenging to effectively convey the radio-frequency signals through the housing wall.

The electronic device may be provided with one or more dielectric (impedance) matching layers between the antenna element and the housing wall. The number of dielectric matching layers, the thickness of each dielectric matching layer, and the dielectric constant of each dielectric matching layer may be configured to reduce signal reflection caused by the impedance mismatch between the housing wall and the surrounding air medium in scenarios where the dielectric matching layers are omitted.

In some illustrative configurations, the electronic device may for a near-field wireless communication link with external equipment having wireless circuitry with a corresponding antenna element. If desired, the external equipment may help test, debug, configure, restore, and/or otherwise update the firmware of the electronic device using the wireless communication link. The conveyance of radio-frequency signals by the external equipment antenna element (with the corresponding electronic device antenna element) may be affected by the presence of the electronic device housing wall. One or more dielectric matching layers may be provided on the external equipment to interpose between the external equipment antenna element and the electronic device housing wall. The one or more dielectric matching layer may similarly be configured to reduce signal reflection associated with the housing wall.

If desired, the electronic device may be provided with a modified housing wall portion aligned with the communication channel between the antenna elements instead of or in addition to the dielectric matching layers in the communication channel. As an example, the housing wall may include a dielectric window formed from a material having a lower dielectric constant than the surrounding portions of the housing wall. As another example, the housing wall may have a planar interior surface and a planar exterior surface. If desired, the inner surface may be modified to have a concave surface portion or a convex surface portion that overlaps the antenna elements.

DETAILED DESCRIPTION

An illustrative system such as wireless communication system 8 may include one or more electronic devices such as electronic devices 10-1 and 10-2 and any other electronic device(s). Electronic devices in system 8 may each be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, a wireless power device, firmware testing, debugging, or restoring equipment, equipment that implements the functionality of two or more of these devices, or other electronic equipment.

Figure 1:
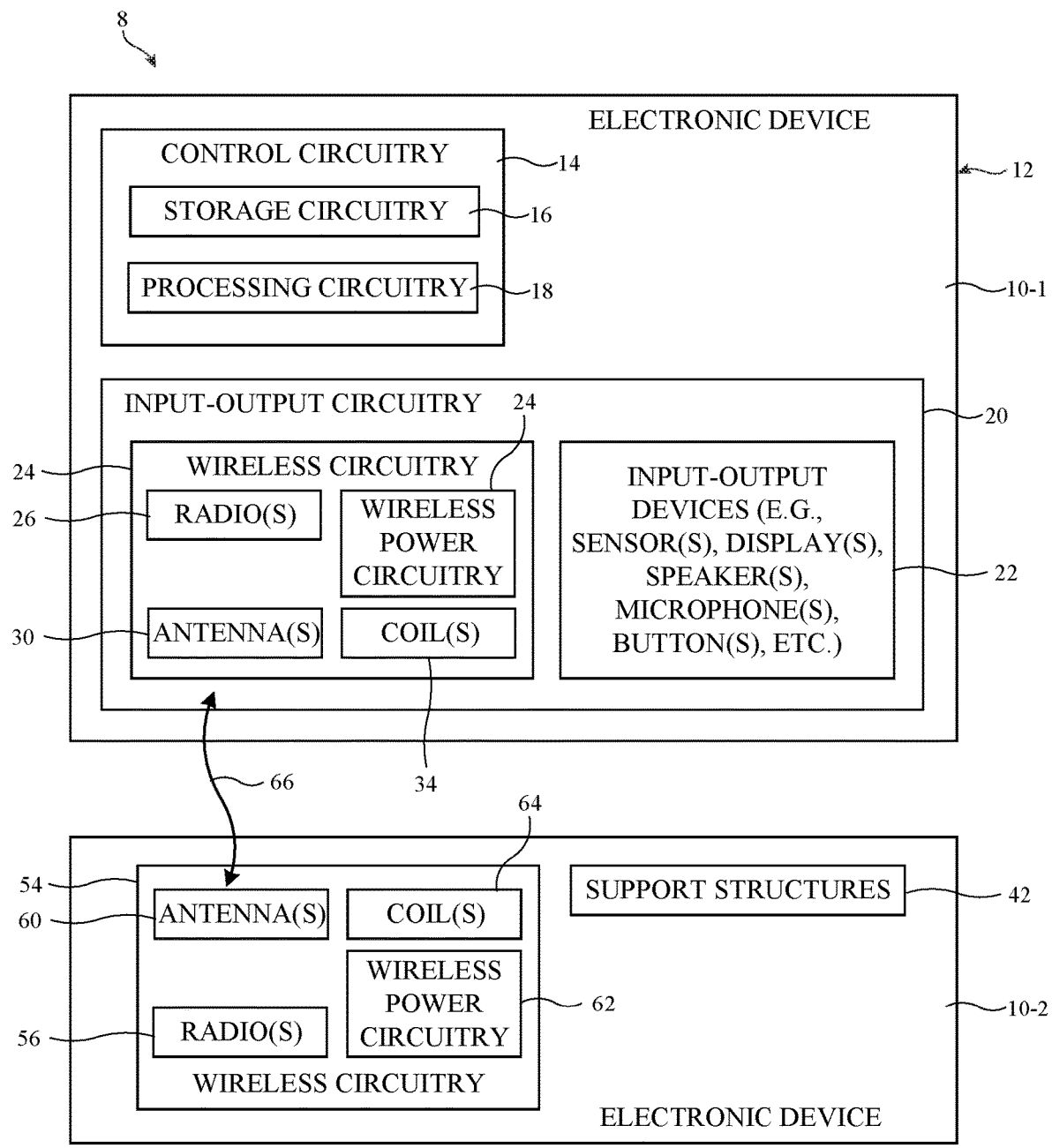
FIG. 1 is a block diagram of an illustrative wireless communication system in accordance with some embodiments.

As shown in the functional block diagram of FIG. 1, an illustrative device 10-1 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10-1 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10-1 and/or removable storage media.

Control circuitry 14 may include processing circuitry such as processing circuitry 18. Processing circuitry 18 may be used to control the operation of device 10-1. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10-1 using hardware (e.g., dedicated hardware or circuitry), firmware, and/or software. Software code for performing operations in device 10-1 may be stored on storage circuitry 16 (e.g., storage circuitry 16 may include non-transitory (tangible) computer readable storage media that stores the software code). The software code may sometimes be referred to as program instructions, software, firmware, data, instructions, or code. Software code stored on storage circuitry 16 may be executed by processing circuitry 18.

Control circuitry 14 may be used to run software on device 10-1 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10-1 may include input-output circuitry 20. Input-output circuitry 20 may include input-output devices 22. Input-output devices 22 may be used to allow data to be supplied to device 10-1 and to allow data to be provided from device 10-1 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10-1 using wired or wireless connections.

Input-output circuitry 20 may include wireless circuitry 24 to support wireless communications and/or radio-based spatial ranging operations. Wireless circuitry 24 may include one or more antennas 30. Wireless circuitry 24 may also include one or more radios 26. Each radio 26 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 30. The components of each radio 26 may be mounted onto a respective substrate or integrated into a respective integrated circuit, chip, package (e.g., system-in-package), or system-on-chip (SOC). If desired, the components of multiple radios 26 may share a single substrate, integrated circuit, chip, package, or SOC.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time. Wireless circuitry 24 may include any desired number of antennas 30.

Transceiver circuitry in radios 26 may convey radio-frequency signals using one or more antennas 30 (e.g., antenna(s) 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) 30 each involve the excitation or resonance of antenna currents on an antenna resonating element in the antenna by the radio-frequency signals within the frequency band(s) of operation of the antenna.

Radios 26 may use antennas 30 to transmit and/or receive radio-frequency signals within different frequency bands at radio frequencies (sometimes referred to herein as communications bands or simply as a "bands"). The frequency bands handled by radios 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 26 may transmit and/or receive radio-frequency signals according to a respective radio access technology (RAT) that determines the physical connection methodology for the components in the corresponding radio. One or more radios 26 may implement multiple RATs if desired. As just one example, the radios 26 in device 10-1 may include a UWB radio for conveying UWB signals using one or more antennas 30, a Bluetooth (BT) radio for conveying BT signals using one or more antennas 30, a Wi-Fi radio for conveying WLAN signals using one or more antennas 30, a cellular radio for conveying cellular telephone signals using one or more antennas 30 (e.g., in 4G frequency bands, 5G FR1 bands, and/or 5G FR2 bands), and an NFC radio for conveying NFC signals using one or more antennas 30. This example is merely illustrative and, in general, radios 26 may include any desired combination of radios for covering any desired combination of RATs.

Wireless circuitry 24 may include wireless power circuitry such as wireless power (receiving) circuitry 32 and coil structures such as one or more coils 34. Device 10-1 may use wireless power circuitry 32 and coil 34 to receive wirelessly transmitted power (e.g., wireless charging signals) from a wireless power adapter (e.g., a wireless power transmitting device).

The wireless power adapter may pass AC currents through the wireless power transmitting coil to produce a time-varying electromagnetic (e.g., magnetic) field that is received as wireless power (wireless charging signals) by coil 34 in device 10-1. Wireless power circuitry 32 may include converter circuitry such as rectifier circuitry that generate a DC voltage for powering device 10-1 from the wireless charging signals. The DC voltage produced by the rectifier circuitry in wireless power circuitry 32 can be used in charging an energy storage device such as a battery and/or can be used in powering other components in device 10-1.

While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24).

Radios 26 may use antennas 30 to transmit and/or receive radio-frequency signals to convey wireless communication data between device 10-1 and one or more other external wireless communication equipment or devices. In the illustrative example of FIG. 1, system 8 includes electronic device 10-2 (sometimes referred to herein as external equipment 10-2 or electronic equipment 10-2), which may have one or more of the same elements as described above in connection with electronic device 10-1. In particular, as shown in FIG. 1, electronic device 10-2 may include wireless circuitry such as wireless circuitry 54 having one or more radios such as radios 56 and one or more antennas such as antennas 60.

Devices 10-1 and 10-2 may be communicatively coupled via one or more communication links 66 via respective wireless circuitry. Wireless communication data may be conveyed between devices 10-1 and 10-2 bidirectionally or unidirectionally. As examples, devices 10-1 and 10-2 may form a half-duplex communication link or a full-duplex communication link.

Configurations in which devices 10-1 and 10-2 form a near-field wireless communication link 66 are described herein as illustrative examples. The near-field nature of wireless communication link 66 refers to the relatively short distance through which devices 10-1 and 10-2 may be wirelessly communicatively coupled. As examples, respective wireless circuitry (antennas) on devices 10-1 and 10-2 may be separated by a distance less than ten centimeters, less than five centimeters, less than four centimeters, less than two centimeters, etc., or across a distance of greater than one centimeter, greater than two centimeters, greater than five centimeters, etc. These examples are merely illustrative. If desired, wireless communication link 66 may be established across other distances.

Configurations in which device 10-2 implements firmware update equipment such as equipment configured to perform firmware testing, debugging, restoring, and/or other functions relating to the firmware of device 10-1 are described herein as illustrative examples. If desired, device 10-2 may be or implement equipment or devices having other functionalities.

In some of these configurations for device 10-2, the wireless communication data being conveyed with device 10-1 may include data that has been encoded into corresponding data packets such as wireless data associated with software applications running on device 10-1, wireless data associated with software updates for device 10-1, wireless data associated with testing, debugging, and/or repairing device 10-1, wireless data associated with resetting or restoring device 10-1 to a default or factory setting, wireless data associated with a telephone call, a message, streaming media content, or internet browsing, etc.

In some of these configurations for device 10-2, wireless circuitry 54 in device 10-2 may include wireless power (transmitting) circuitry 62 and coil structures such as one or more coils 64. Configured in this manner, device 10-2 may use wireless power circuitry 62 and coil 64 to transmit wireless power (signals) to device 10-1.

In some of these illustrative configurations for device 10-2, device 10-2 may include support structures 42 such as platforms, carriers, docks, or other structures to which wireless circuitry and other components (e.g., control circuitry, input-output devices, etc.) for device 10-2 are mounted and which are configured to receive device 10-1. As examples, support structures 42 may be formed of plastic, glass, ceramics, fiber composites, metal, other suitable materials, or a combination of these materials.

The example of FIG. 1 is merely illustrative. If desired, system 8 may include any suitable number of electronic devices or equipment (e.g., having similar elements as device 10-1 and/or device 10-2). If desired, device 10-1 or device 10-2 may be communicatively coupled to one or more of these other electronic devices or equipment instead of or in addition to each other, or may operate in isolation at times. If desired, devices 10-1 and 10-2 may include any other suitable elements or may omit one or more elements described in connection with FIG. 1.

Figure 2:
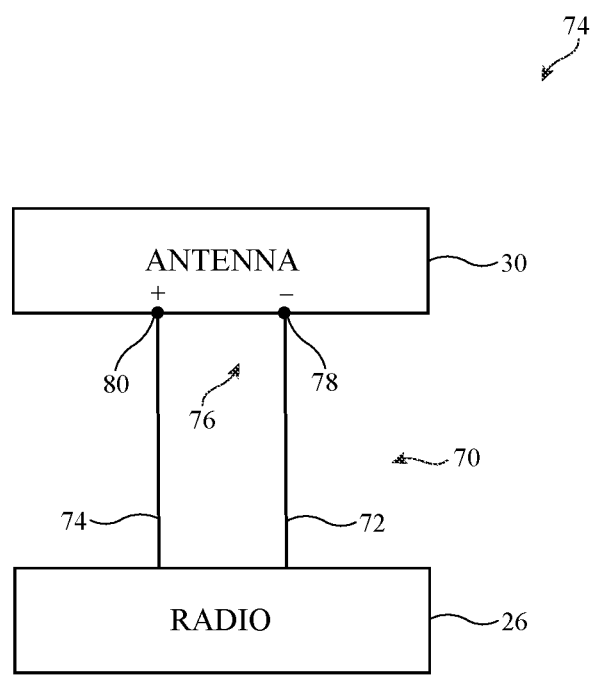
FIG. 2 is a block diagram of illustrative wireless circuitry in accordance with some embodiments.

FIG. 2 is a functional block diagram of wireless circuitry 24 of FIG. 1. As shown in FIG. 2, each radio 26 may be coupled to one or more antennas 30 over one or more radio-frequency transmission lines 70. As an illustrative example, each radio-frequency transmission line 36 may include a ground conductor such as ground conductor 72 and a signal conductor such as signal conductor 74. A corresponding antenna 30 may include an antenna feed such as antenna feed 76 having ground antenna feed terminal 78 coupled to ground conductor 72 and positive antenna feed terminal 80 coupled to signal conductor 80. If desired, transmission line 70 may include additional signal conductors coupled to additional positive antenna feed terminals.

One or more radio-frequency transmission lines 70 may be shared between radios 26 and/or antennas 30 if desired. Radio-frequency front end (RFFE) modules may be interposed on one or more radio-frequency transmission lines 70. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 70.

While FIG. 2 describes one or more radios 26 and one or more antennas 30 in device 10-1 (FIG. 1), other electronic devices such as device 10-2 and other devices in system 8 may include one or more radios and antennas configured in the same manner.

In some illustrative configurations, electronic devices may include high-data-rate wired connectors. These wired connectors can be bulky and take up excess interior space, and require external input-output ports that render the electronic device less secure. It may therefore be desirable to provide wireless circuitry that can establish high-data-rate wireless communication links.

However, providing wireless circuitry that operate at relatively high frequencies such as at one or more frequencies greater than 10 GHz such as at a frequency band including 60 GHz, at other centimeter and millimeter wave frequency bands, at terahertz wave frequency bands, etc., thereby allowing for high-data-rate data transfer, can raise significant challenges. As examples, it may be challenging to provide the wireless circuitry at these frequencies in a compact manner to provide space-savings, other components in each wireless device (e.g., other portions of the wireless circuitry, conductive elements, housing structures, etc.) have the potential to interfere with the operation of the wireless circuitry for establishing these wireless communication links, misalignments between the communicating devices (e.g., the respective wireless circuitry) and intervening structures between the respective wireless circuitry can degrade the wireless communication links. As such, one or more of the electronic devices in system 8 (FIG. 1) may be provided with improved wireless circuitry while taking into account one or more of these issues.

Figure 3:
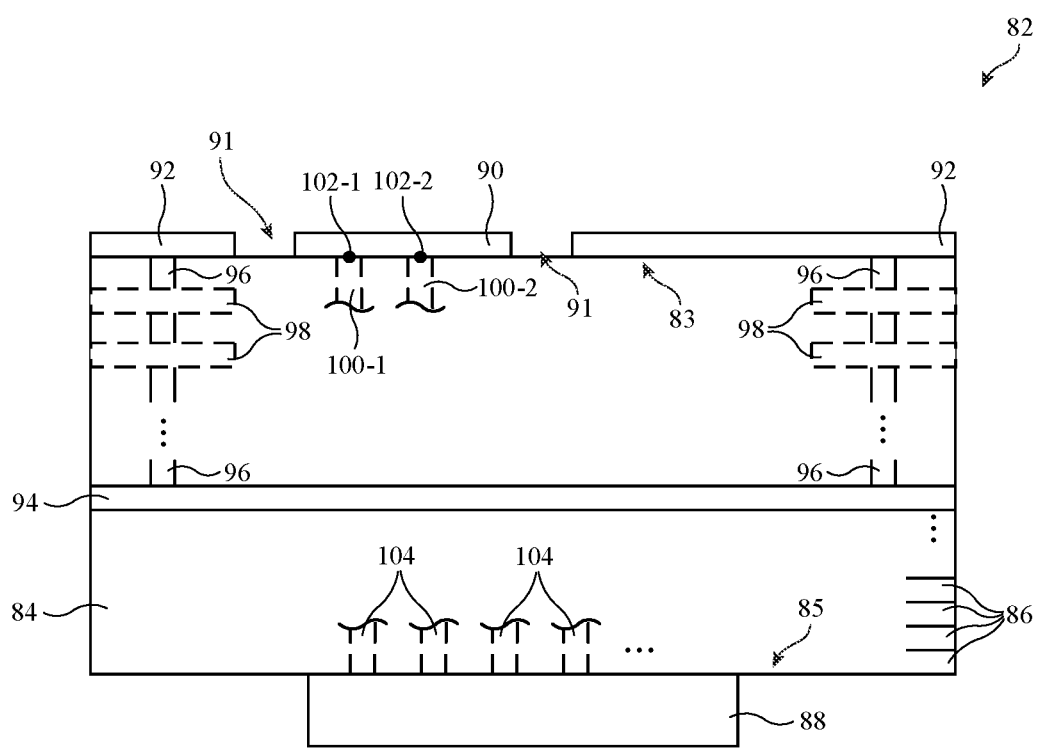
FIG. 3 is a cross-sectional view of an illustrative wireless communication module in accordance with some embodiments.

FIG. 3 is a cross-sectional view of an illustrative wireless communication module such as wireless communication module 82 that can implement wireless circuitry for one or more devices (e.g., devices in system 8 in FIG. 1). Configurations in which wireless communication module 82 operate at one or more frequencies greater than 10 GHz (e.g., at a 60 GHz frequency band, between 10 GHz and 300 GHz for centimeter and millimeter wave frequency bands, between 0.3 THz and 30 THz for terahertz wave frequency bands, etc.) to convey firmware testing data, firmware debugging data, firmware repair data, firmware restore data, and/or device configuration data are described herein as illustrative examples. If desired, wireless communication module 82 may operate at any suitable frequency (e.g., covering one or more suitable frequency bands) and may coney any suitable type of data for the desired function.

As shown in FIG. 3, module 82 may include a substrate such as substrate 84. Substrate 84 may include multiple layers 86 and may therefore be referred to as a multi-layer substrate. Some of layers 86 may be formed from one or more non-conductive materials such as dielectric materials, some of layers 86 may be conductive materials such as metallic materials, and some of layers 86 may be formed from other materials such as semiconducting materials.

Substrate 84 has first and second opposing surfaces (e.g., top and bottom surfaces in FIG. 3). An antenna resonating element for an antenna such as a conductive (metal) patch element 90 may be disposed on the first surface of substrate 84. An antenna ground structure for the antenna such as conductive ground layer 92 (sometimes referred to as ground ring 92) may also be disposed on the first surface of substrate 84. Ground layer 92 may surround patch element 90 and be separated from patch element 90 by dielectric gap 91. Additional antenna ground structures such as ground layer 94 for the antenna may be embedded in substrate 84. Conductive structures such as conductive vias 96 in substrate 84 may couple (e.g., electrically short) ground layer 92 at the first surface to embedded ground layer 94. One or more additional intervening conductive ground layers 98 may also be coupled (e.g., electrically shorted) to vias 96. Configured in this manner, conductive ground structures for the antenna (e.g., ground layers 92, 94, and 98, and vias 96) may surround and define a cavity for patch element 90.

Module 82 may include radio component 88 such as a radio-frequency integrated circuit or an integrated circuit implementing a radio (e.g., radio 26 in FIG. 1) for patch element 90. The integrated circuit forming radio component 88 may include one or more elements described in connection with radios 26 in FIG. 1. Radio component 88 may be mounted to the second side of substrate 84. Radio component 88 may provide antennas signals along one or more signal paths 104 to the antenna elements (e.g., patch element 90, ground structures, etc.). As an example, signal paths 104 may form transmission line structures (e.g., signal conductor paths, ground conductor paths, etc.) coupled to the antenna resonating element and the antenna ground. As shown in FIG. 3, the antenna may include one or more positive antenna feed terminals such as terminals 102-1 and 102-2 coupled to patch element 90. Radio component 88 may provide antenna signals along a first signal conductor formed from signal paths 104 and 100-1 coupled to terminal 102-1. Radio component 88 may provide antenna signals along a second signal conductor formed from signals paths 104 and 100-2 coupled to terminal 102-2. Radio component 88 may provide one or more ground conductors coupled to antenna ground structures on module 82.

If desired, module 82 may include input-output structures such as input-output pads, input-output ports, input-output pins, etc. on the second surface of substrate 84. Radio component 88 may be coupled to signal paths 104 via these input-output structures at the second surface (e.g., via solder). These input-output structures may allow module 82 (e.g., radio component 88 in module 82) to interface with other components in an electronic device. As an example, module 82 in a device and the control circuitry in the device may be mounted to a shared package substrate. In this example, the control circuitry may be couple to radio component 88 via one or more signal paths to convey data for wireless communication. These signal paths may include metal routing layers in the shared package substrate, a first set of input-output structures connecting the package substrate to module 82, metal routing layers in substrate 84, and a second set of input-output structures coupling radio component 88 to the metal routing layers in substrate 84.

Figure 4:
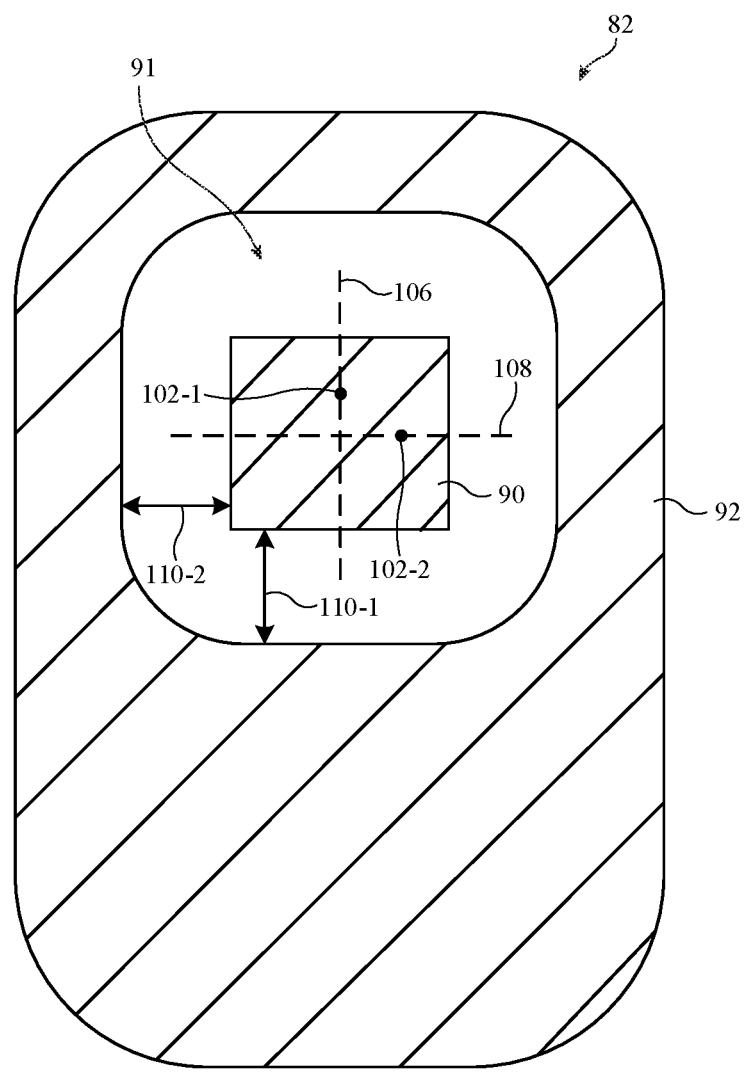
FIG. 4 is a top-down view of the wireless communication module of FIG. 3 in accordance with some embodiments.

FIG. 4 is a top-down view of the wireless communication module 82 of FIG. 3. As shown in FIG. 4, patch element 90 may have a rectangular outline (e.g., a square outline). Accordingly, the rectangle may have two main (central) perpendicular axes 106 and 108. Antenna feed terminal 102-1 may lie along axis 106. Antenna feed terminal 102-2 may lie along axis 108. Configured in such a manner, patch element 90 may be operable to convey radio-frequency signals having multiple polarizations. As an example, radio-frequency signals conveyed using terminal 102-1 may have a first linear polarization, and radio-frequency signals conveyed using terminal 102-2 may have a second linear polarization (that is orthogonal to the first linear polarization).

These configurations for patch element 90 are merely illustrative. If desired, patch element 90 may have any suitable shape or outline. If desired, one or more antenna feed terminals may be coupled to patch element 90 at one or more suitable locations. If desired, patch element 90 may convey radio-frequency signals of a single polarization or may convey radio-frequency signals of different circular polarizations.

As shown in FIG. 4, ground layer 92 may be separated from patch element 90 by dielectric gap 91 (e.g., an air gap or a gap filled by non-conductive material). Dielectric gap 91 may run all the way around the periphery of patch element 90. In other words, ground layer 92 may surround patch element 90 along each of the peripheral edges of patch element 90 and may have edges that run parallel to the corresponding peripheral edges of patch element 90. If desired, distances separating opposing edges of ground layer 92 and patch element 90 may be the same. In particular, distances 110-1 and 110-2 and corresponding distances between patch element 90 and ground layer 92 at other peripheral edges may be the same. If desired, one or more of these distances may be different from each other.

As shown in FIG. 4, module 84 may have a rectangular outline with rounded corners. The rounded corners of module 84 may help accommodate module 84 into cramped spaces. Ground layer 92 may have inner edges that define an edge of gap 91 (e.g., a suitable separation from patch element 90). The inner edges of ground layer 92 may also have a rectangular outline with rounded corners to help maintain a suitable separation from patch element 90. Ground layer 92 may span from the inner edges to outer edges at the peripheral edges of module 82. This may help with improving the manufacturing process for module 82. In the example of FIG. 4, the rectangular outline of module 82 may have a geometric center, and the outline of patch element 90 may have a geometric center that is offset from the geometric center of module 82. If desired, other configurations for module 82 may be used.

The use of wireless communication module 82 to implement the wireless circuitry for one or more devices in system 8 (e.g., devices 10-1 and 10-2) is merely illustrative. If desired, one or more devices in system 8 may include antenna elements implemented separately from the corresponding radio components such as on a separate module, on a separate substrate, etc. or wireless circuitry implemented in other suitable manners. Illustrative embodiments described herein may be applicable to any of these wireless circuitry configurations.

In some configurations described herein as illustrative examples, device 10-1 may be a portable device such as a wristwatch device (e.g., a smart watch). If desired, device 10-1 may instead be implemented as other portable devices such as a cellular telephone, a tablet device, or another portable computing device, or generally, any other suitable devices or equipment.

Figure 5:
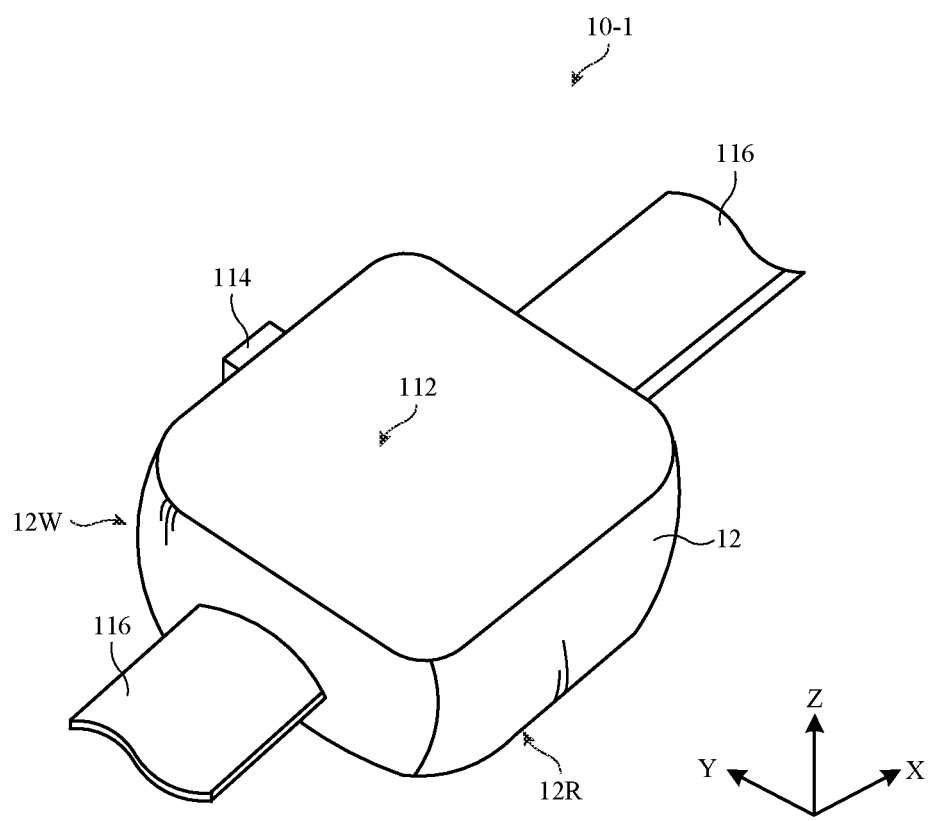
FIG. 5 is a perspective view of an illustrative electronic device in the wireless communication system of FIG. 1 in accordance with some embodiments.

FIG. 5 is a perspective view of an illustrative portable electronic device that may implement device 10-1. In the example of FIG. 5, device 10-1 includes a display such as display 112. Display 112 may be mounted to a housing such as housing 12. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 112 may be formed at (e.g., mounted on) the front side (face) of device 10-1. Housing 12 may have a rear housing wall on the rear side (face) of device 10 such as rear housing wall 12R that opposes the front face of device 10-1. Conductive housing sidewalls 12W may surround the periphery of device 10-1 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic such as zirconia, wood, polymer, combinations of these materials, or any other desired dielectrics.

Rear housing wall 12R and/or display 112 may extend across some or all of the length (e.g., parallel to the X-axis) and width (e.g., parallel to the Y-axis) of device 10-1. Conductive housing sidewalls 12W may extend across some or all of the height of device 10-1 (e.g., parallel to the Z-axis). Conductive housing sidewalls 12W and/or rear housing wall 12R may form one or more exterior surfaces of device 10-1 (e.g., surfaces that are visible to a user of device 10-1) and/or may be implemented using internal structures that do not form exterior surfaces of device 10-1 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

Display 112 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 112 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10-1, for example.

Device 10-1 may include buttons such as button 114. There may be any suitable number of buttons in device 10-1. Buttons may be located in openings in housing 12 (e.g., openings in conductive housing sidewall 12W or rear housing wall 12R). Buttons may be rotary buttons, sliding buttons, buttons that are actuated by pressing on a movable button member, etc. Button members for buttons such as button 114 may be formed from metal, glass, plastic, or other materials.

Device 10-1 may, if desired, be coupled to a strap such as strap 116. Strap 116 may be used to hold device 10-1 against a user's wrist (as an example). Strap 116 may sometimes be referred to herein as wrist strap 116. In the example of FIG. 5, wrist strap 116 is connected to opposing sides of device 10-1. Conductive housing sidewalls 12W and/or rear housing wall 12R may include attachment structures for securing wrist strap 116 to housing 12 (e.g., lugs or other attachment mechanisms that configure housing 12 to receive wrist strap 116). Configurations that do not include straps may also be used for device 10-1.

Figure 6:
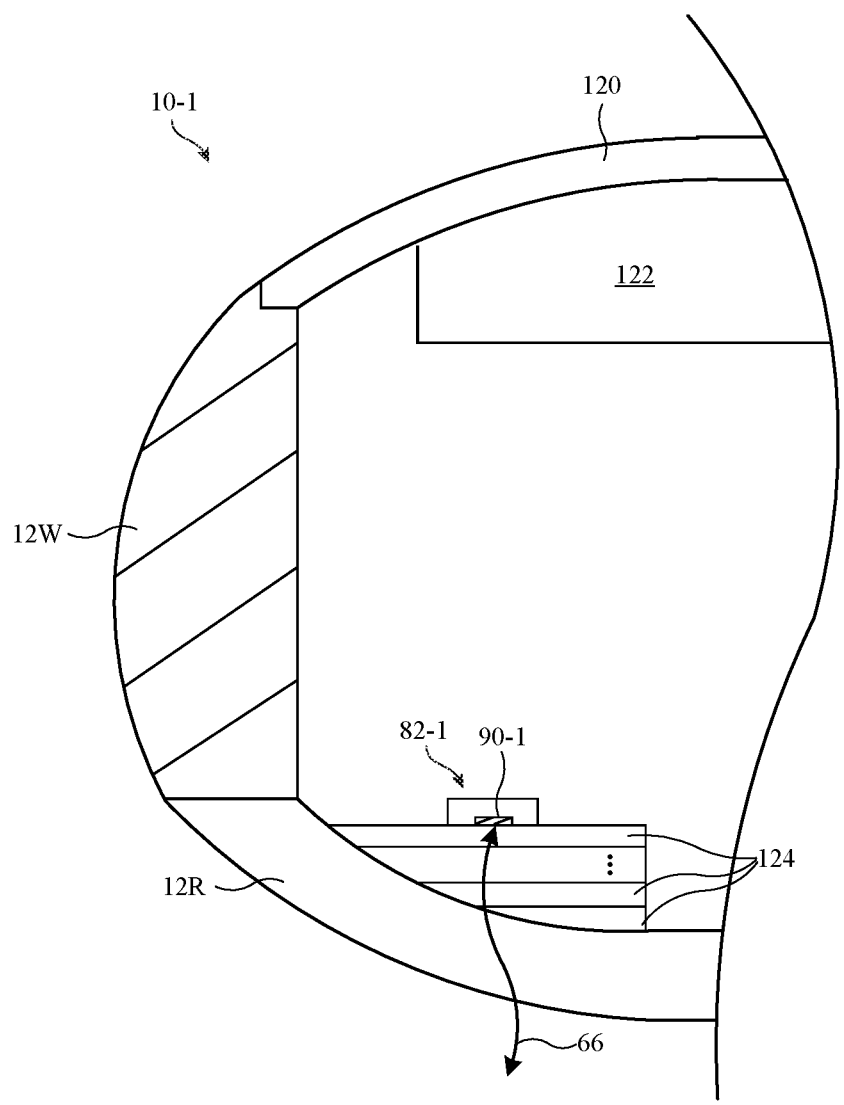
FIG. 6 is a cross-sectional view of an illustrative peripheral portion of an electronic device incorporating a wireless communication module in accordance with some embodiments.

FIG. 6 is a partial cross-sectional side view of electronic device 10-1 (FIG. 5) showing how an antenna in a wireless communication module may be mounted within device 10-1 for conveying radio-frequency signals through rear housing wall 12R. As shown in FIG. 6, a display may form the front face of device 10-1, whereas rear housing wall 12R forms the rear face of device 10-1. In the example of FIG. 6, rear housing wall 12R is formed from a dielectric material such as glass, sapphire, ceramic such as zirconia, or plastic. This is merely illustrative and, if desired, rear housing wall 12R may also include conductive portions (e.g., a conductive frame surrounding one or more dielectric windows in rear housing wall 12R, conductive cosmetic layers, etc.).

The display may include a display cover layer 120 over a display module 122. Display module 122 may, for example, form an active area or portion of the display that displays images and/or receives touch sensor input. The lateral portion of the display that does not include display module 122 (e.g., portions of the display formed from display cover layer 120 but without an underlying portion of display module 122) may sometimes be referred to herein as the inactive area or portion of the display.

Display module 122 may include conductive components (sometimes referred to herein as conductive display structures) that are used in forming portions of an antenna that radiates through the front face of device 10-1 (e.g., an antenna having a radiating element such as a radiating slot element defined by display module 122 and/or conductive housing sidewalls 12W). The conductive display structures in display module 122 may, for example, have planar shapes (e.g., planar rectangular shapes, planar circular shapes, etc.) and may be formed from metal and/or other conductive material that carries antenna currents for a front-facing antenna in device 10-1. The conductive display structures may include a frame for display module 122, pixel circuitry, touch sensor electrodes, an embedded near-field communications antenna, etc.

Display cover layer 120 may be formed from an optically transparent dielectric such as glass, sapphire, ceramic, or plastic. Display module 122 may display images (e.g., emit image light) through display cover layer 120 for view by a user and/or may gather touch or force sensor inputs through display cover layer 120. If desired, portions of display cover layer 120 may be provided with opaque masking layers (e.g., ink masking layers) and/or pigment to obscure the interior of device 10-1 from view of a user.

It may be desirable to remove wired connector structures in an electronic device to provide a seamless exterior device surface, improve device waterproofing, and optimize useable device interior space by removing bulky connector components, etc. As an example, an electronic device can include wired connector ports for receiving for testing, debug, and/or restoring firmware on the electronic device or for other functions. It may be desirable to remove these wired ports and connectors.

To preserve the functionalities of the wired connector, it may be desirable to provide wireless circuitry that has one or more of the same functionalities. In the above example, it may be desirable to provide wireless for conveying test, debugging, and/or restoring the firmware of the electronic device. To maintain and/or improve existing applications of wired connection with wireless connections, the wireless connections may convey data using high data rates in a bidirectional wireless communication link. The wireless communication link may be established between wireless circuitry across a distance of less than ten centimeters, less than five centimeters, less than four centimeters, less than two centimeters, etc., or across a distance of greater than one centimeter, greater than two centimeters, greater than five centimeters, etc. Across these distances, the wireless communication link may be referred to as a near-field wireless communication link. The near-field wireless communication link may be formed from conveyance of radio-frequency signals having near-field characteristics. If desired, radio-frequency signals having far-field characteristics may also conveyed to form the wireless communication link. The wireless communication link may convey data using high data rate data transfer operations at speeds of 100 Kilobit per second or more, 1 Megabit per second (Mbps) or more, 100 Mbps or more, at 500 Mbps or more, 1 Gigabit bit per second or more, etc. to satisfactorily replace some wired connections (e.g., wired connection for conveying debug, test, restore and/or other data).

The examples of removing and/or replacing wired connections for conveying debug, test, and/or restore data are merely illustrative. If desired, it may be similarly desirable to remove and/or replace other wired connections such as USB wired connections or wired connections based on other protocols, or wired connections for conveying other types of signals with wireless connections.

As shown in FIG. 6, wireless circuitry such as wireless communication module 82-1 (e.g., wireless communication module 82 in FIGS. 3 and 4) having antenna element 90-1 may be disposed within device 10-1. If desired, wireless communication module 82-1 or other wireless circuitry in device 10-1 may be configured to provide the high data rate wireless links for near-field applications.

Substrates such as one or more rigid printed circuit boards, one or more flexible printed circuits, one or more package substrates, etc. may be located within the interior of device 10-1. In some illustrative configurations, wireless communication module 82-1 may be mounted to a system package substrate implementing a system package (or system-in-package (SIP)). Other device components such as one or more integrated circuits implementing control circuitry 14 or other circuitry, input-output circuitry 20 of FIG. 1, etc., may also be mounted to the system substrate or be disposed elsewhere in device 10-1.

While replacing wired connectors with wireless circuitry such as wireless communication module 82-1 may be desired for the above-mentioned advantages, significant challenges may exist, particularly when providing the high-data-rate wireless communication links. In particular, the wireless circuitry and the corresponding antenna element may convey radio-frequency signals at relatively high frequencies such as at one or more frequencies greater than 10 GHz (e.g., at a 60 GHz frequency band, between 10 GHz and 300 GHz for centimeter and millimeter wave frequency bands, between 0.3 THz and 30 THz for terahertz wave frequency bands, etc.) to support high-data-rate (near-field) wireless communication links. Other device structures may interfere with the conveyance of these radio-frequency signals.

Still referring to FIG. 6, housing structures such as housing wall 12R in FIG. 6 may be formed from one or more materials with relative high dielectric constants such as a dielectric constant great than 3, greater than 5, greater than 7, greater than 10, greater than 20, greater than 30, etc. As examples, housing wall 12R may be formed from zirconia, sapphire, or liquid crystal, or other suitable dielectric material. Without anything more (e.g., assuming an air gap spanning the distance between module 82-1 having antenna element 90-1 and housing wall 12R), when antenna element 90-1 conveys radio-frequency signals at one or more frequencies greater than 10 GHz, signal reflectance may be exhibited at the interface between the air and housing wall 12R. This signal reflectance may be caused by impedance mismatch between the air medium and the dielectric material forming housing wall 12R and can lead to degradation of wireless communication link 66.

In order to mitigate the effects of signal reflectance due to this mismatch, one or more matching layers 124 (sometimes referred to herein as filler or filled material layers) may be interposed between antenna element 90-1 and housing wall 12R. As examples, one or more matching layers 124 may include a polymer layer such as an elastomer layer (e.g., a silicone rubber layer, a silicone layer, etc.), a plastic layer, a glass layer, a dielectric foam structure, or any other dielectric structures. In general, one or more of these materials may be used to implement matching layers 124 based on their dielectric constants relative to that of housing wall 12R. The one or more matching layers 124 may include one or more air gap layers, for example, due to the process of manufacturing layers 124 or due to intentionally introducing one or more air gap layers to modify the physical characteristics of the communication channel.

One or more layers 124 may be mounted to or adhered to one another and/or to dielectric housing wall 12R. In some illustrative configurations, housing wall 12R may include a cavity aligned to antenna element 90-1, and one of more layers 124 may fill the cavity to interpose between antenna element 90-1 and a portion of housing wall 12R.

If desired, antenna module 82-1 and/or antenna element 90-1 may be mounted to or adhered to a top surface of a topmost layer 124. In some illustrative embodiments, the topmost layer 124 may be an air gap layer. In other words, module 82-1 and/or antenna element 90-1 may be separated from a topmost solid matching layer 124 by an air gap.

Configuration in this manner, one or more matching layers 124 and housing wall 12R may serve as a portion of the communication channel through which antenna element 90-1 may convey radio-frequency signals to and from the exterior of device 10-1. Additional elements in external equipment (e.g., equipment external to device 10-1) such as device 10-2 may serve as another portion of the communication channel to and from which antenna element 90-1 conveys radio-frequency signals.

Figure 7:
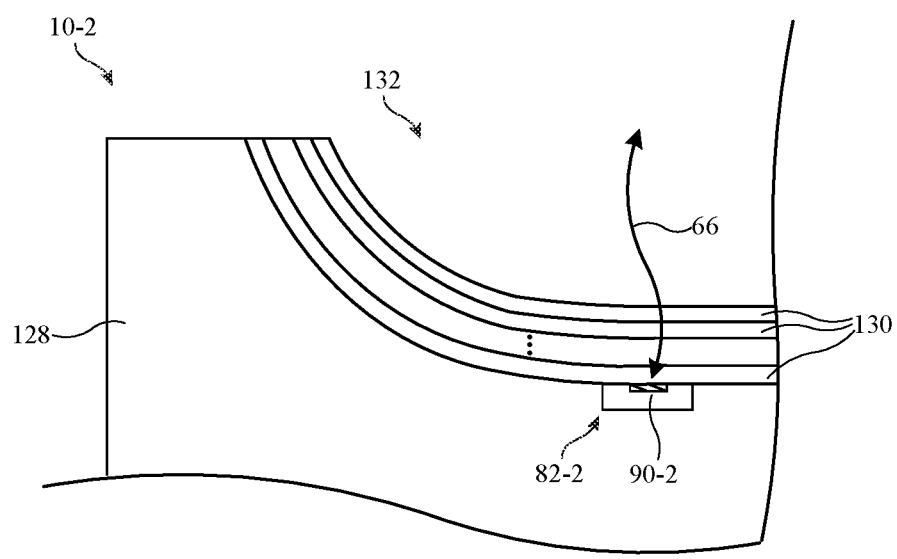
FIG. 7 is a cross-sectional view of an illustrative portion of external equipment in the wireless communication system of FIG. 1 incorporating a wireless communication module in accordance with some embodiment.

FIG. 7 is a cross-sectional view of a portion of external test equipment such as a dock that may implement device 10-2. In particular, device 10-2 may be configured to receive device 10-1. As shown in FIG. 7, device 10-2 may include an opening 132. Opening 132 may be configured to receive device 10-1 such that rear housing wall 12R may be placed (rests) on the surface defining opening 132. Device 10-2 may include wireless circuitry such as wireless communication module 82-2 having antenna element 90-2 configured to communicate with antenna element 90-1 in communication module 82-2 via near-field wireless communication link 66.

Device 10-2 may include support structures 128, sometimes referred to herein as housing structure 128 configured to enclose functional elements in device 10-2 such as wireless communication module 82-2. As examples, support structure 128 may include a platform on which functional components such as wireless circuitry, control circuitry, etc. are mounted, antenna mounting and alignment structures configured to fix the position of wireless communication module 82-2 and antenna element 90-2, and any other suitable support structures configured to support other elements in device 10-2.

As shown in FIG. 7, device 10-2 may also include one or more matching layers 130. Similar to matching layers 124 for device 10-1, the one or more matching layers 130 may be interposed between antenna element 90-2 in device 10-2 and housing wall 12R in device 10-1 when received in opening 132. As examples, one or more matching layers 130 may include a polymer layer such as an elastomer layer (e.g., a silicone rubber layer, a silicone layer, etc.), a plastic layer, a dielectric glass layer, a dielectric foam structure, or any other dielectric structures. In general, one or more of these materials may be used to implement matching layers 130 based on their dielectric constants relative to that of housing wall 12R in device 10-1. The one or more matching layers 130 may include one or more air gap layers, for example, due to the process of manufacturing layers 130 or due to intentionally introducing one or more air gap layers to modify the physical characteristics of the communication channel.

One or more layers 130 may be mounted to or adhered to one another and/or to antenna module 82-2 and/or antenna element 90-2. In the example of FIG. 7, a top surface of the topmost layer 130 may define the exterior surface of device 10-2 (e.g., may cover a portion of support structures 128). As such, when device 10-1 is placed in opening 132, housing wall 12R may be placed on the top surface of the topmost layer 130 with minimal separation and minimal disruption in the communication channel between antenna elements 90-1 and 90-2.

Configurations in which antenna elements 90-1 and 90-2 are implemented in respective wireless communication modules as described in connection with FIG. 7 are merely illustrative. If desired, the introduction of one or more (dielectric) matching layers in device 10-1 and/or 10-2 may generally be applied to two antenna resonating elements configured in any other suitable manner such as when they are not implemented in respective encapsulated modules.

Figure 8:
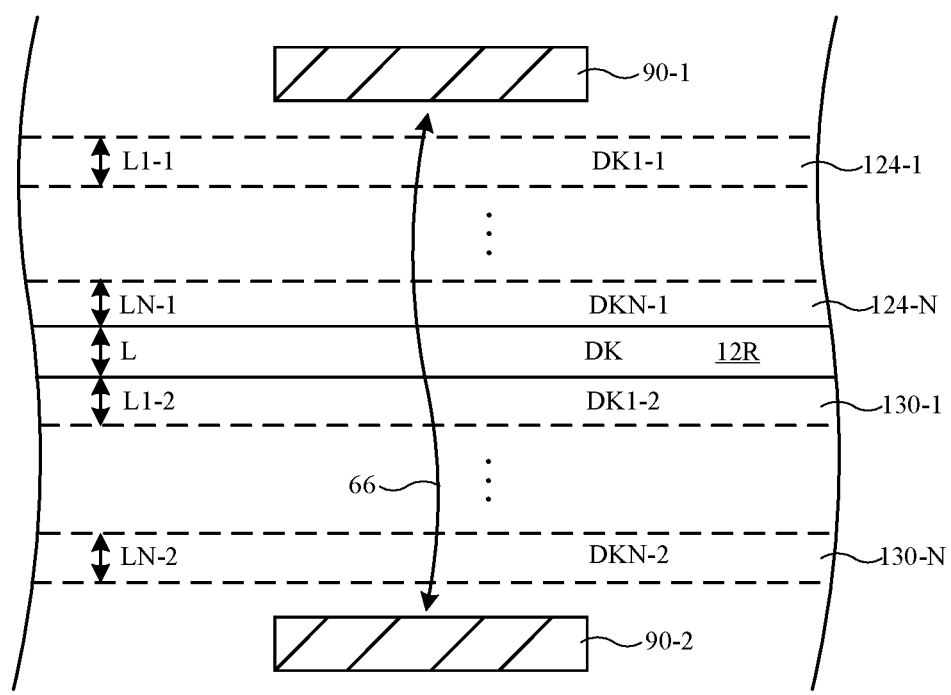
FIG. 8 is a diagram of illustrative intervening layers in a communication channel between two antenna elements in accordance with some embodiments.

FIG. 8 is an illustrative diagram showing how a near-field communication channel may be formed between two antenna resonating elements such as antenna resonating element 90-1 in device 10-1 and antenna resonating element 90-2 in device 10-2 (when device 10-1 is received at opening 132 on device 10-2 in FIG. 7). As shown in FIG. 8, dielectric (impedance) matching layers 124 (referring to one or more layers 124-1, 124-2, . . . , 124-N) in device 10-1 may each have a dielectric constant and a thickness. As examples, dielectric matching layer 124-1 may have a thickness L1-1 and a dielectric constant DK1-1, and in general, dielectric matching layer 124-N may have a thickness LN-1 and a dielectric constant DKN-1. Similarly, dielectric matching layers 130 (referring to one or more layers 130-1, 130-2, . . . , 130-N) in device 10-2 may each have a dielectric constant and a thickness. As examples, dielectric matching layer 130-1 may have a thickness L1-2 and a dielectric constant DK1-2, and in general, dielectric matching layer 130-N may have a thickness LN-2 and a dielectric constant DKN-2.

As shown in FIG. 8, the interposing layers between antenna elements 90-1 and 90-2 may form a multilayer dielectric structure. The number of interposing layers, the thickness of each layer, and the type of material used for each layer may be determined based on the overall reflection coefficient for the different layers in the multilayer dielectric structure. In other words, the number of interposing layers, and layer characteristics such as dielectric constant of each layer and thickness of each layer may be configured to reduce the overall reflection coefficient (compared to scenarios without these interposing layers adjacent to housing wall 12R).

In some illustrative configurations, a single dielectric matching layer 130-1 may be interposed between antenna element 90-2 (of device 10-2) and housing wall 12R (of device 10-1). In other words, other dielectric matching layers 130-N may be omitted. As an example, in these illustrative configurations, housing wall 12R may be formed from a ceramic material such as zirconia or another dielectric material having a dielectric constant greater than 10, and the single dielectric matching layer 130-1 may be formed from a polymer or specifically an elastomer such as silicone rubber, a dielectric substrate, or other suitable dielectric material having a dielectric constant between 2 and 5, between 2 and 6, between 2 and 10, or generally between 1 and the dielectric constant of housing wall 12R. The single dielectric matching layer 130-1 may be mounted to and/or supported by support structures on device 10-2 (e.g., support structures 128) on one or more sides to overlap antenna element 90-2. The single dielectric matching layer 130-1 may define a portion of the exterior surface of device 10-2 at which device 10-2 receives device 10-1 such that housing wall 12R rests directly on the single dielectric matching layer 130-1. In particular, it may be desirable to provide a polymer or elastic material layer as the single dielectric matching layer 130-1 given its mechanical properties and that the single dielectric matching layer 130-1 forms at least part of the surface configured to receive device 10-1. If desired, when device 10-2 receives device 10-1, device 10-2 may be configured to separate housing wall 12R from the single dielectric matching layer 130-1 by an air gap layer.

In some illustrative configurations, a single dielectric matching layer 124-1 may be interposed between antenna element 90-1 (of device 10-1) and housing wall 12R (of device 10-1). In other words, other dielectric matching layers 124-N may be omitted. As an example, in these illustrative configurations, housing wall 12R may be formed from a ceramic material such as zirconia or another dielectric material having a dielectric constant greater than 10, and the single dielectric matching layer 124-1 may be formed from a dielectric substrate, a polymer such as silicone rubber, or other suitable dielectric material having a dielectric constant between 2 and 5, between 2 and 6, between 2 and 10, or generally between 1 and the dielectric constant of housing wall 12R. The single dielectric matching layer 124-1 may be mounted to an interior surface of housing wall 12R, or may otherwise be mounted to interpose between antenna element 90-1 and housing wall 12R.

In some illustrative configurations, in order to minimize signal reflectance at housing wall 12R, it may be desirable to provide multiple dielectric matching layers having dielectric constants that increase as the layers approach housing wall 12R. As an example, dielectric matching layer 124-1 may have a first dielectric constant, dielectric matching layer 124-2 (between layer 124-1 and housing wall 12R) may have a second dielectric constant greater than the first dielectric constant, dielectric matching layer 124-3 (between layer 124-2 and housing wall 12R) may have a third dielectric constant greater than the second dielectric constant, etc. Similarly, dielectric matching layer 130-1 may have a first dielectric constant, dielectric matching layer 130-2 (further away from housing wall 12R than dielectric matching layer 130-1) may have a second dielectric constant less than the first dielectric constant, dielectric matching layer 130-3 (further away from housing wall 12R than dielectric matching layer 130-2) may have a third dielectric constant greater than the second dielectric constant, etc. These examples are merely illustrative. As described above, the thickness of each of these illustrative layers, along with their dielectric constants, may be configured to reduce signal reflection (compared to scenarios in which matching layers 124 and 130 are omitted).

The examples of FIGS. 6-8 are merely illustrative. If desired, the dielectric matching structure between housing wall 12R and antenna element 90-1 may be omitted, and the dielectric matching structure between housing wall 12R and antenna element 90-2 may be implemented in one or more layers. If desired, the dielectric matching structure between housing wall 12R and antenna element 90-2 may be omitted, and the dielectric matching structure between housing wall 12R and antenna element 90-1 may be implemented in one or more layers.

In some configurations of device 10-1, there may be physical, mechanical, manufacturing, and/or other constraints that make it challenging to provide one or more matching layers between antenna element 90-1 and housing wall 12R. In some configurations of device 10-1, it may be desirable to further improve the wireless communications link characteristics such as link quality, link directionality, etc.

In these scenarios and in other scenarios, the characteristics of housing wall 12R may be altered to optimize the near-field wireless communication link established by antenna element 90-1 in device 10-1 (e.g., with antenna element 90-2 in device 10-2). In particular, a first portion of housing wall 12R overlapping antenna element 90-1 may exhibit at least one different physical property than the second portion of housing wall 12R surrounding the first portion. If desired, the second portion does not overlap antenna element 90-1. The different physical properties may include different material properties (e.g., different dielectric constants), different dimensional properties (e.g., different thicknesses or generally different geometries), or other different physical properties.

Figure 9:
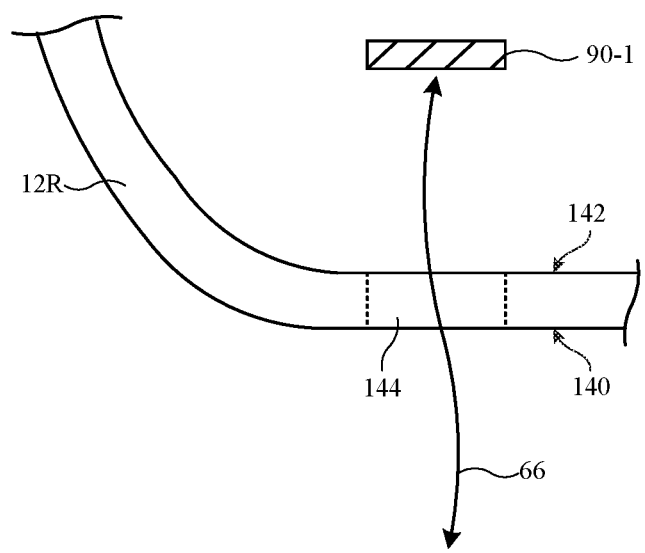
FIG. 9 is a diagram of an illustrative housing wall having a portion through which an antenna element conveys radio-frequency signals in accordance with some embodiments.

As shown in FIG. 9, housing wall 12R may include a planar portion of the housing having a first planar surface such as surface 140 and a second planar surface such as surface 142. Surface 140 may face an exterior of device 10-1 and may sometimes be referred to as an exterior surface. While surface 140 faces the exterior of device 10-1, other cosmetic layers and coating layers may cover surface 140, if desired. Surface 142 may face an interior of device 10-1 and may sometimes be referred to as an interior surface.

In configurations described herein as illustrative examples, housing wall 12R may be formed from a material such as zirconia, sapphire, or liquid crystal having a relatively high dielectric constant (e.g., a dielectric constant greater than 5, greater than 10, etc.). When antenna element 90-1 conveys radio-frequency signal (at frequencies greater than 10 GHz) through housing 12R, the radio-frequency signals may exhibit significant signal reflection at the air-wall interface (e.g., at surfaces 142).

As shown in FIG. 9, housing wall 12R may include a housing wall portion 144 overlapping antenna 90-1 that is formed from a material having a lower dielectric constant than the material forming the surrounding portion of housing wall 12R. This may help reduce signal reflection and improve the quality of signal conveyance and consequently the quality near-field wireless communication link. As an illustrative example, housing wall portion 144 may be formed by filling a window cutout in housing wall 12R with the lower dielectric constant material. The filled window cutout may be aligned with antenna element 90-1 and/or have a same outline as antenna element 90-1, if desired.

The geometry of interior surface 142 of housing wall 12R may be helpful to the antenna element 90-1 conveying electromagnetic waves (associated with the radio-frequency signals) through housing wall 12R in an efficient manner. In some illustrative configurations (e.g., for a given thickness and material of housing wall 12R), the planar interior surface of housing wall 12R (FIG. 9) may be optimal for signal conveyance. FIGS. 10A, 10B, 11A, and 11B are diagrams showing how housing wall 12R may have a housing wall portion (overlapped by an antenna element) exhibiting different interior surface geometries.

Figure 10A:
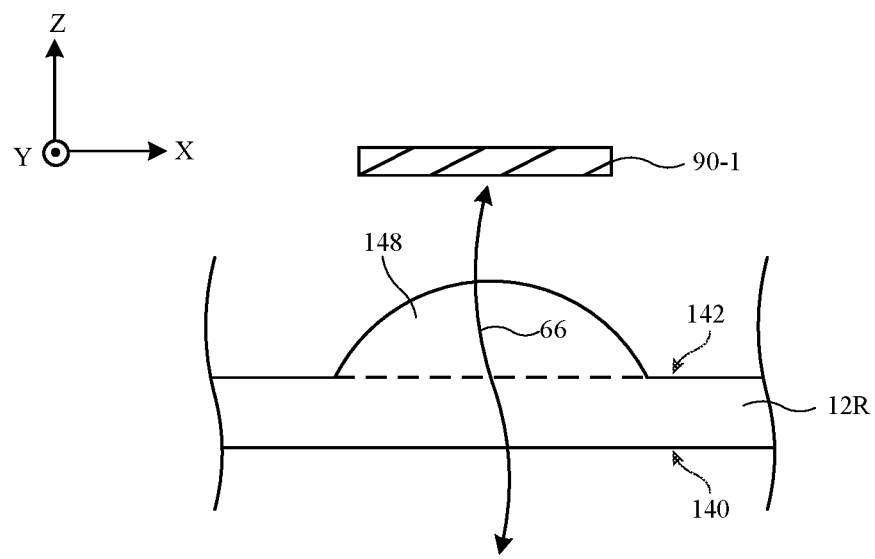
FIGS. 10A and 10B are diagrams of an illustrative housing wall having a convex surface through which an antenna element conveys radio-frequency signals in accordance with some embodiments.
Figure 10B:
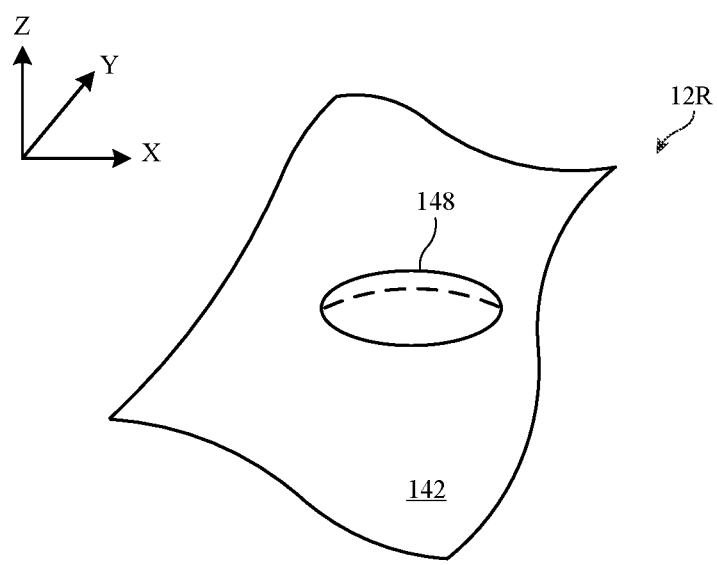

As shown in FIG. 10A, housing wall 12R may have a housing wall portion with a protrusion 148 along surface 142 that define a convex geometry for the interior surface portion aligned with antenna element 90-1. In particular, protrusion 148 (surface 142) may protrude toward antenna element 90-1 and may be aligned with antenna element 90-1. As shown in FIG. 10B, protrusion 148 may have a circular outline or be a dome-shaped protrusion. In other words, the portion of housing wall 12R having protrusion 148 may have a greater thickness at all points than the surrounding portion of housing wall 12R.

Figure 11A:
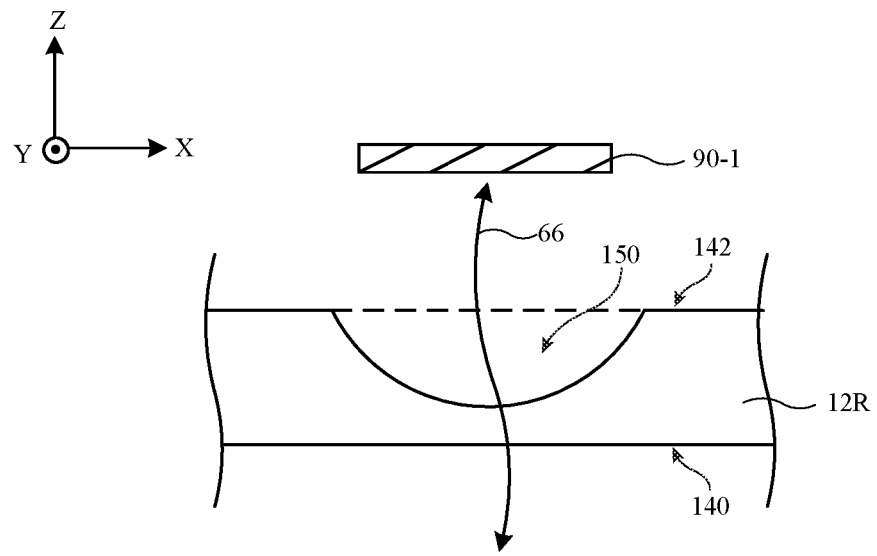
FIGS. 11A and 11B are diagrams of an illustrative housing wall having a concave surface through which an antenna element conveys radio-frequency signals in accordance with some embodiments.
Figure 11B:
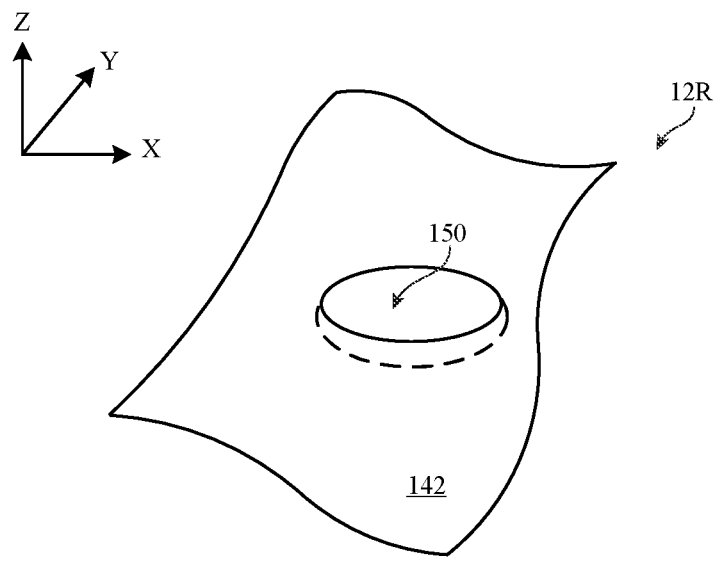

As shown in FIG. 11A, housing wall 12R may have a housing wall portion with a recess 150 along surface 142 that define a concave geometry for the interior surface portion aligned with antenna element 90-1. In particular, recess 150 (surface 142) may recede away from antenna element 90-1 and may be aligned with antenna element 90-1. As shown in FIG. 10B, recess 150 may have a circular outline or be a dome-shaped recess. In other words, the portion of housing wall 12R having recess 150 may have a smaller thickness at all points than the surrounding portion of housing wall 12R.

Configured in the manner as described in connection with FIGS. 9-11, the interior surface 142 of housing wall 12 may be configured to exhibit different geometries that define different thicknesses at the portion of housing wall 12 overlapping antenna element 90-1, thereby allowing the electromagnetic waves to focus and maximizing the communication range of antenna element 90-1 (e.g., with antenna element 90-2). In other words, the different interior surfaces 142 may provide a lensing effect for antenna element 90-1. By only modifying the geometry of the interior surface, the exterior surface may still exhibit any desired geometry (e.g., a planar surface) to provide seamless exterior surface for device 10-1.

Figure 12:
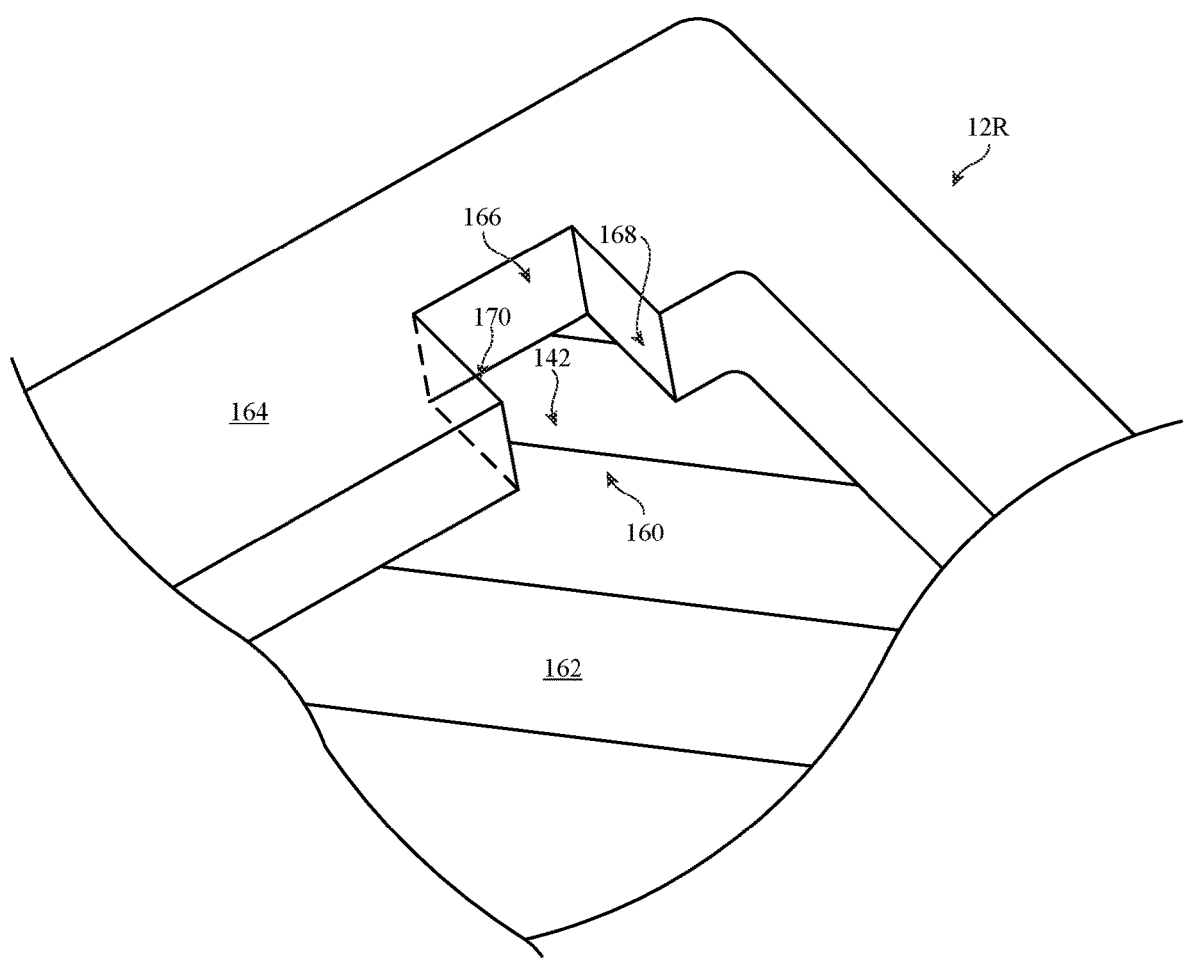
FIG. 12 is a perspective view of an illustrative region of a housing wall containing a cavity aligned with an antenna element in accordance with some embodiments.

FIG. 12 is a perspective view of an illustrative corner region of housing wall 12R (e.g., at a corner region of device 10-1). As shown in FIG. 12, housing wall 12R may have a ledge portion such as ledge 164 that is raised from a lower surface 162 of housing wall 12R. Lower surface 162 may form a portion of an interior surface of housing wall 12R. Ledge 164 may be a portion of housing wall 12R that is coupled (e.g., attached) to sidewalls 12W. Ledge 164 may run along at least two peripheral sides of device 10-1 as shown in FIG. 12. If desired, ledge 164 may run along all four peripheral sides of device 10-1 (e.g., around the periphery of device 10-1). As shown in FIG. 12, the two portions of ledge 164 running along the two peripheral sides of device 10-1 may be joined at a corner of housing wall 12R.

In the example of FIG. 12, an opening 160 (sometimes referred to as a depression or cavity) may be formed from a depression in ledge 164 along one of the peripheral sides of device 10-1. In one illustrative configuration, antenna element 90-1 may be mounted to ledge 164 of housing wall 12-1 and may overlap opening 160. Configured in this manner, antenna element 90-1 may be configured to convey radio-frequency signals through opening 160 and a portion of housing wall 12R.

Opening 160 may have peripheral sides (boundaries) defined by surfaces 166, 168, and 170 of ledge 164. While opening 160 is shown to be fully enclosed on three sides by surfaces 166, 168, and 170, this is merely illustrative. If desired, opening 160 through which antenna element 90-1 conveys radio-frequency signals may extend away from ledge 164 and surfaces 168 and 170 may only partly define the peripheral boundaries of opening 160.

In the example of FIG. 12, cavity 160 is shown to extend from the top surface of ledge 164 to a bottom surface 142 that is coplanar with surface 162. However, this is merely illustrative. If desired, bottom surface 142 of cavity 160 may still be raised relative to surface 162. If desired, the depth of cavity 160 (e.g., the position of bottom surface 142) and the width and length of depression 160 (e.g., the position of surfaces 166, 168, and 170) may configured to allow for wave formation within opening 132 by antenna element 90.

As an illustrative example, the various interior surface geometries (e.g., planar, convex, concave) of the interior surface of housing wall 12R (as described in connection with FIGS. 9-11) may be implemented at interior surface 142 in cavity 160. The dimensions (e.g., depth) of cavity 160 combined with the geometry of surface 142 in FIG. 12 may configured to focus the electromagnetic waves or radio-frequency signals. If desired, cavity 160 may be omitted, and/or the various interior surface geometries of the interior surface of housing wall 12R may be implemented at interior surface 162 away from ledge 164.

In particular, opening 160 may be formed at a corner region of ledge 164. This may allow antenna element 90-1 may be placed near the corner of device 10-1 in order to avoid interference from other components within device 10-1 and to provide a compact implementation.

The configuration of FIG. 12 is merely illustrative. While different portions of housing wall 12R as shown to have planar surfaces, this is merely illustrative. If desired, one or more of these surfaces (e.g., surfaces 142, 162, 166, 168, 170, etc.) may be curved surfaces. While opening 160 (and consequently antenna element 90-1) is shown to be formed in a corner region of ledge 164 in housing wall 12R, opening 160 and antenna element 90 may instead be disposed in other suitable locations, if desired.

Figure 13:
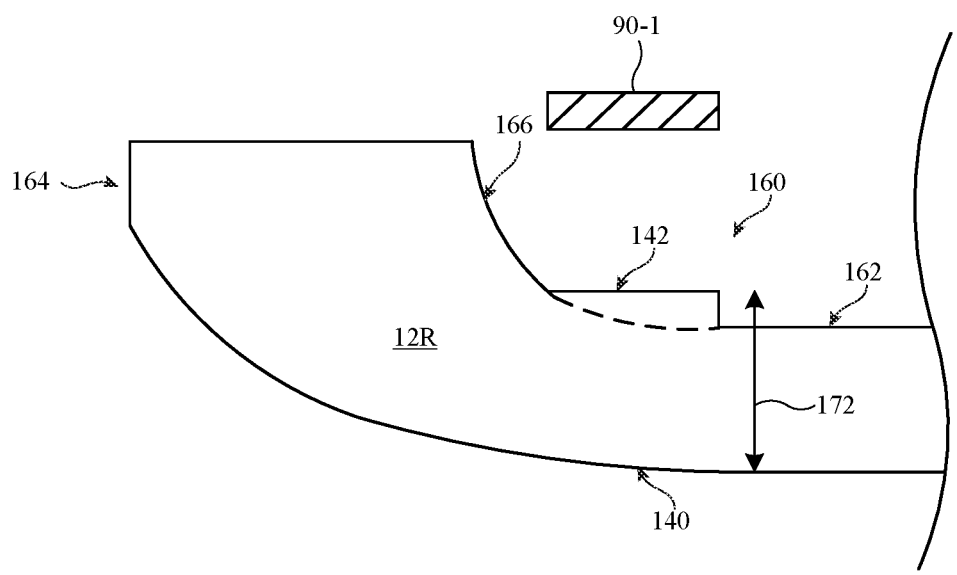
FIG. 13 is a cross-sectional view of an illustrative region of a housing wall containing a cavity aligned with an antenna element in accordance with some embodiments.

FIG. 13 is a cross-sectional view of a cavity region of housing wall 12R aligned with antenna element 90-1 (e.g., the cavity region shown in FIG. 12). As shown in FIG. 13 and described as an illustrative configuration in connection with FIG. 12, opening 160 may have a bottom surface 142 raised relative to interior surface 162. Distance 172 between interior surface 142 and exterior surface 140 may define the (housing wall) interface through which antenna element 90-1 conveys radio-frequency signals. As such, the thickness (as well as the dielectric constant) of the housing wall portion between surfaces 142 and 140 (along with any interposing dielectric matching layers) may be critical to and as such configured to reduce signal reflectance and/or to focus the electromagnetic waves, thereby enabling a satisfactory wireless communication link.

As examples, the housing wall portion between surfaces 140 and 142 may have a thickness between greater than 0.1 centimeters, greater than 0.25 centimeters, greater than 0.5 centimeters, greater than 1 centimeter, less than 1.5 centimeters, less than 2 centimeters, less than 3 centimeters, less than 5 centimeters, etc. These examples are merely illustrative (e.g., in an illustrative configuration where the housing wall portion is formed from zirconia, antenna element 90-1 is operating in a frequency band including 60 GHz, etc.). If desired, the thickness (as well as the material and shape) of the housing wall portion may be adjusted based on the frequency of operation, the surrounding (dielectric matching) layers, etc. As examples, surface 142 may be raised above surface 162 by different amounts, may be lowered to be a depression from surface 162, may have lensing portions as such as those described in connection with FIGS. 10 and 11, may be overlapped by dielectric matching layers such as those described in connection with FIG. 6, etc.

While configurations in which antenna elements convey radio-frequency signals to form a near-field communication link across a rear housing wall are described in connection with FIGS. 6-12, these configurations are merely illustrative. If desired, similar structures as described in FIGS. 6-12 such as dielectric matching structures, housing walls with varying interior surface geometries and with varying materials, etc., may also be implemented for other housing walls or housing structures (e.g., a dielectric sidewall, a display cover layer, etc.) or for any other suitable structures.

The foregoing is merely illustrative and various modifications can be made to the described embodiments. The foregoing embodiments may be implemented individually or in any combination.

What is claimed is:

1. An electronic device having first and second faces, comprising:
    a housing having a housing wall at the first face;
    a display mounted to the housing and disposed at the second face;
    an antenna resonating element configured to form a near-field wireless communication link with external equipment by conveying radio-frequency signals at a frequency greater than 10 GHz through the housing wall;
    a dielectric matching layer interposed between the antenna resonating element and the housing wall, wherein the dielectric matching layer is interposed between the antenna resonating element and a first portion of the housing wall, the first portion of the housing wall is surrounded by a second portion of the housing wall, the first portion of the housing wall differs from the second portion of the housing wall in at least one physical property, the housing wall has a ledge portion that partly defines a cavity overlapping the antenna resonating element, and the first portion of the housing wall overlaps the cavity; and
    an air gap interposed between the antenna resonating element and the housing wall, wherein the air gap, the dielectric matching layer, and the housing wall form a channel through which the radio-frequency signals are conveyed.

2. The electronic device defined in claim 1, wherein the housing wall is formed from a first material having a first dielectric constant and the dielectric matching layer is formed from a second material having a second dielectric constant less than the first dielectric constant.

3. The electronic device defined in claim 2, further comprising:
    an additional dielectric matching layer interposed between the antenna resonating element and the dielectric matching layer.

4. The electronic device defined in claim 3, wherein the additional dielectric matching layer is formed from a third material having a third dielectric constant less than the second dielectric constant.

5. The electronic device defined in claim 4, wherein the dielectric matching layer and the additional dielectric matching layer have respective thicknesses and respective dielectric constants based on a thickness and a dielectric constant of the housing wall.

6. The electronic device defined in claim 2, wherein the first dielectric constant of the first material forming the housing wall is greater than 10.

7. The electronic device defined in claim 1, wherein the housing wall is configured to rest on the external equipment to form the near-field wireless communication link.

8. The electronic device defined in claim 1 further comprising:
a wireless communication module disposed in the housing having a substrate and a radio-frequency integrated circuit mounted to the substrate, wherein the antenna resonating element comprises a conductive patch on the substrate.

9. The electronic device defined in claim 1, wherein the at least one physical property comprises a material property, the first portion of the housing wall is formed from a first material having a first dielectric constant, and the second portion of the housing wall is formed from a second material having a second dielectric constant greater than the first dielectric constant.

10. The electronic device defined in claim 1, wherein the at least one physical property comprises a dimensional property, the first portion of the housing wall has a thickness different than a thickness of the second portion of the housing wall.

11. The electronic device defined in claim 10, wherein the first portion of the housing wall has a protrusion along an interior surface of the housing wall.

12. The electronic device defined in claim 10, wherein the first portion of the housing wall has a recess along an interior surface of the housing wall.

13. The electronic device defined in claim 1, wherein the air gap is interposed between the antenna resonating element and the dielectric matching layer.

14. The electronic device defined in claim 1, wherein the housing wall has a first dielectric constant greater than a second dielectric constant of the dielectric matching layer and the second dielectric constant of the dielectric matching layer is greater than a third dielectric constant of the air gap.

15. An electronic device having first and second faces, comprising:
a housing having a housing wall at the first face;
a display mounted to the housing and disposed at the second face;
an antenna resonating element configured to form a near-field wireless communication link with external equipment by conveying radio-frequency signals at a frequency greater than 10 GHz through the housing wall; and
a dielectric matching layer interposed between the antenna resonating element and a first portion of the housing wall, wherein the first portion of the housing wall is surrounded by a second portion of the housing wall, the first portion of the housing wall has a thickness different than a thickness of the second portion of the housing wall, and the first portion of the housing wall comprises a recess at an interior surface of the housing wall.

16. An electronic device having first and second faces, comprising:
a housing having a housing wall at the first face;
a display mounted to the housing and disposed at the second face;
an antenna resonating element configured to form a near-field wireless communication link with external equipment by conveying radio-frequency signals at a frequency greater than 10 GHz through the housing wall; and
a dielectric matching layer interposed between the antenna resonating element and a first portion of the housing wall, wherein the first portion of the housing wall is surrounded by a second portion of the housing wall, the first portion of the housing wall differs from the second portion of the housing wall in at least one physical property, the housing wall has a ledge portion that partly defines a cavity overlapping the antenna resonating element, and the first portion of the housing wall overlaps the cavity.

17. The electronic device defined in claim 16, wherein the at least one physical property comprises at least one of a material property and a dimensional property.

* * * * *